United States Patent [19]

Wilson et al.

[11] Patent Number: 5,205,898

[45] Date of Patent: Apr. 27, 1993

[54] CONTINUOUS FIBER THERMOPLASTIC PREPREG

[75] Inventors: Maywood L. Wilson, Tabb; Gary S. Johnson, Hampton, both of Va.

[73] Assignee: The United States of America as represented by the Administrator of the National Aeronautics and Space Administration, Washington, D.C.

[21] Appl. No.: 613,046

[22] Filed: Nov. 15, 1990

[51] Int. Cl.⁵ .................. B05C 3/152; B29B 15/12; B29C 67/14
[52] U.S. Cl. ................... 156/441; 118/124; 118/125; 156/181
[58] Field of Search ............... 156/441, 181, 180, 166; 264/136, 174; 425/114, 93, 102; 118/124, 125, 126, 122, 118

[56] References Cited

U.S. PATENT DOCUMENTS

| | | | |
|---|---|---|---|
| 3,095,338 | 6/1963 | Romanin | 156/441 |
| 3,250,655 | 5/1966 | Adler | 156/181 |
| 4,541,884 | 9/1985 | Cogswell et al. | 156/166 |
| 4,783,349 | 10/1988 | Cogswell et al. | 427/385.5 |
| 4,864,964 | 9/1989 | Hilakos | 156/441 |
| 4,900,499 | 2/1990 | Mills | 156/441 |
| 4,919,739 | 4/1990 | Dyksterhouse et al. | 156/441 |
| 4,957,422 | 9/1990 | Glemet et al. | 425/114 |

Primary Examiner—Caleb Weston
Assistant Examiner—Daniel J. Stemmer
Attorney, Agent, or Firm—George F. Helfrich

[57] ABSTRACT

A pultrusion machine employing a corrugated impregnator vessel to immerse multiple, continuous strand, fiber tow in an impregnating material, and an adjustable metered exit orifice for the impregnator vessel to control the quantity of impregnating material retained by the impregnated fibers, is provided. An adjustable height insert retains transverse rod elements within each depression of the corrugated vessel to maintain the individual fiber tows spread and in contact with the vessel bottom. A series of elongated heating dies, transversely disposed on the pultrusion machine and having flat heating surfaces with radiused edges, ensure adequate temperature exposed dwell time, and exert adequate pressure on the impregnated fiber tows, to provide the desired thickness and fiber/resin ratio in the prepreg formed. The prepreg passing through the pulling mechanism is wound on a suitable take-up spool for subsequent use. A formula is derived for determining the cross sectional area opening of the metering device. A modification in the heating die system employs a heated nip roller in lieu of one of the pressure applying flat dies.

2 Claims, 3 Drawing Sheets

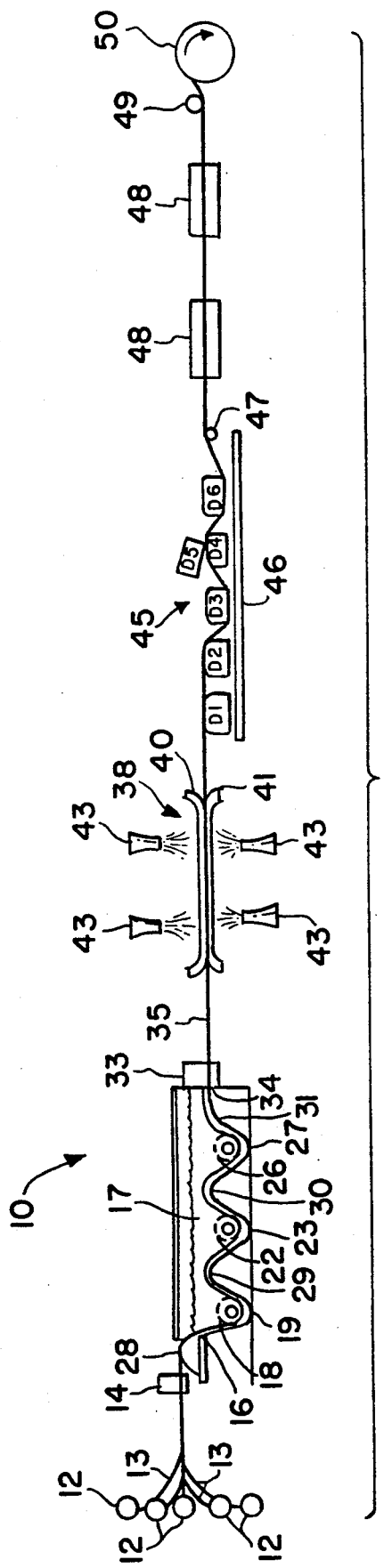
FIG. 1
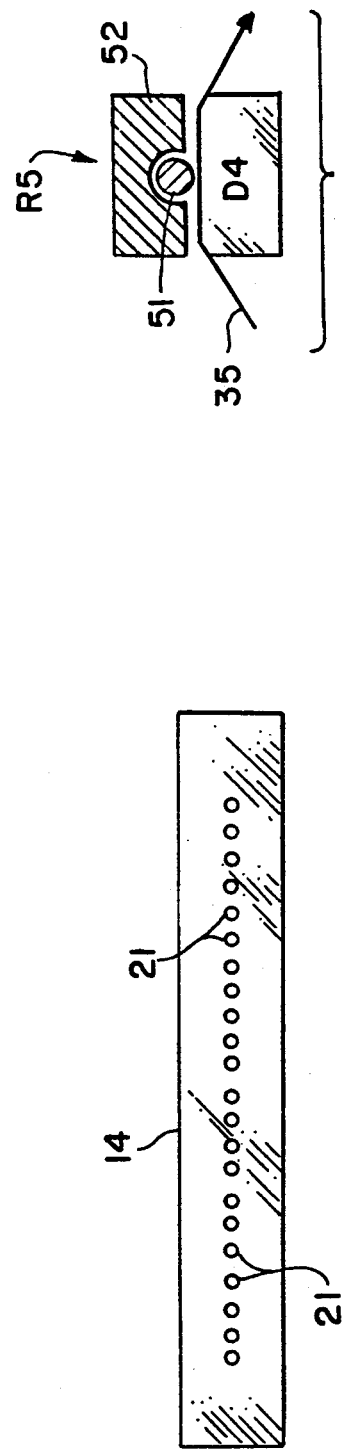
FIG. 1a
FIG. 2

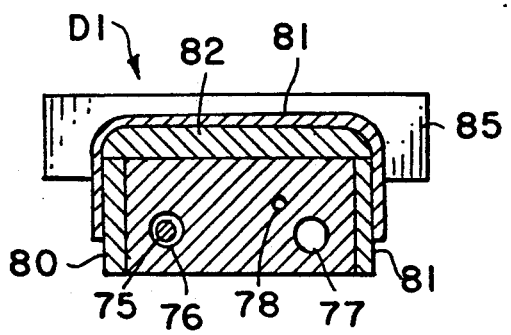
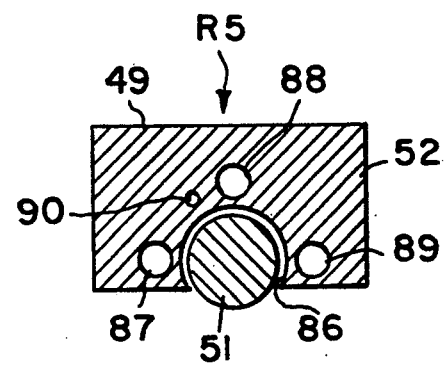
FIG. 6  FIG. 6a
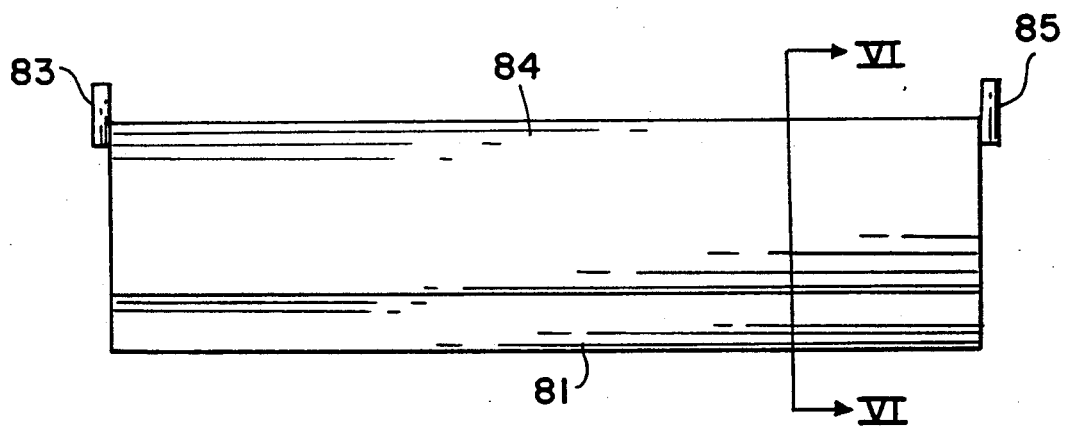
FIG. 7
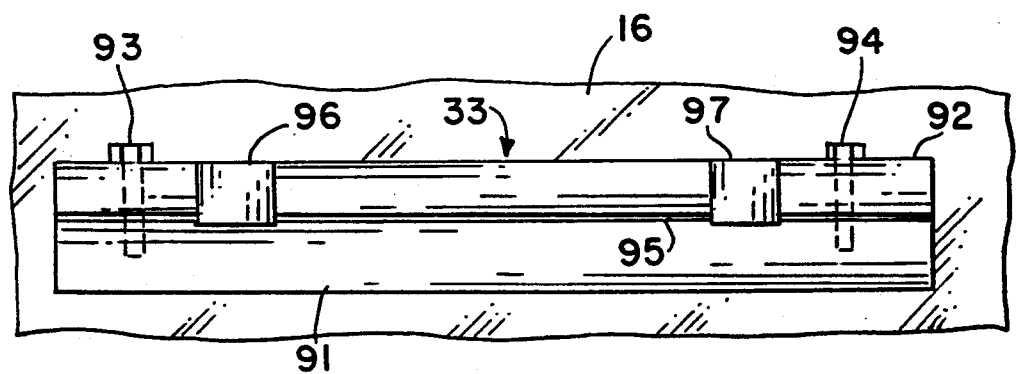
FIG. 8

5,205,898

CONTINUOUS FIBER THERMOPLASTIC PREPREG

ORIGIN OF THE INVENTION

The invention described herein was made by employees of the United States Government and may be manufactured and used by or for the Government for governmental purposes without the payment of any royalties thereon or therefor.

FIELD OF THE INVENTION

This invention relates generally to prepreg tape preparation and relates specifically to a pultrusion apparatus and process for making continuous fiber reinforced thermoplastic prepreg tape.

BACKGROUND OF THE INVENTION

The use of thermosetting and thermoplastic polymers or resins to embed or impregnate carbon, aramid, glass, boron and other materials, and mixtures thereof, to prepare prepreg tapes that are subsequently employed to mold various structures and structural components, is known. These prepregs consist of a single ply, continuous sheet having a preselected thickness and a preselected width and coiled around a spool as produced similar to the way thin sheet metal is coiled for storage. When later used, the prepreg is sliced to required lengths and widths, stacked or oriented, as required to achieve tailored composite properties, and post fabricated by applying heat and pressure in a conventional manner. The prepreg is presently used to fabricate flat and curved laminated panels as well as structural profiles such as hat-sections, I-beams, T-beams, channels, angles, etc., by conventional molding methods.

Some of the problems encountered in making and using prepreg previously have included the formation of extremely brittle final products and, in the case of thermosetting materials, the inability to reshape or change the final molded material. Pultrusion, a process where fiber filaments are impregnated by being pulled through an immersion bath of suitable thermoplastic or thermosetting polymer, either in solution or in a slurry, is presently employed for making prepreg tape of various widths.

One of the problems found in presently used pultrusion processes is the inability to obtain continuous or long lengths of uniform thicknesses and uniform impregnated prepreg having the desired fiber/resin ratio, which results in numerous splicing of the final product and extra work and time in employing these spliced lengths in fabricating finished articles. Also, this non-uniformity in the prepreg, and the use of spliced prepreg, contributes to the high incidence of voids in final structural components molded from presently available prepreg. Problems in obtaining uniform slurries for insoluble impregnating materials and problems in obtaining complete solubility of soluble impregnating materials are also believed to contribute to non-uniform impregnated fibers that can cause voids in final molded products.

SUMMARY OF THE INVENTION

Accordingly, it is an object of the present invention to provide an improved pultrusion apparatus and process for producing continuous fiber reinforced prepreg that may be employed to mold essentially void free structural components.

Another object of the present invention is an improved immersion tank or vessel for impregnating multiple tows of fibers in a pultrusion process.

A further object of the present invention is a novel metering device for controlling the quantity of impregnating material in the impregnated fibers and to recover a prepreg that leads to the desired fiber volume percent in the final product.

An additional object of the present invention is a method of controlling the quantity of impregnating material in the impregnated fibers.

A still further object of the present invention is an improved series of heated dies employed in a pultrusion process of making prepreg.

According to the present invention the foregoing and additional objects are attained by providing a pultrusion machine having multiple spools of fiber tow disposed adjacent one end thereof, a guide fixture disposed between the spools of fiber tow and the pultrusion machine and serving to guide, and maintain separate, individual fiber tows leading from the spools to an immersion vessel. The immersion or impregnator vessel has an entrance and an exit side and contains a quantity of fiber impregnating liquid therein. The immersion vessel is provided with a corrugated interior bottom surface having alternate raised and depressed areas extending transverse to the entrance and exit sides thereof.

A metering device is provided at the exit of the immersion vessel to control the amount of impregnating material contained within the exiting fiber tows. A forced air drying area receives the impregnated fiber tows as they exit the impregnating vessel. A series of elongated heating dies are transversely disposed on the pultrusion machine between the drying area and a reciprocating pulling mechanism. The series of heated dies have flat heating surfaces with radiused edges to ensure adequate dwell time and to exert adequate pressure on the impregnated fiber tows to form a continuous sheet of prepreg having the desired thickness. The prepreg formed is a consolidated composite sheet which can be post-fabricated into useful composite articles by conventional molding processes. The prepreg passing through the pulling mechanism is wound on a suitable take-up spool for subsequent use. A formula is derived for determining the cross sectional area opening of the metering device.

BRIEF DESCRIPTION OF THE DRAWINGS

A more complete appreciation of the invention and many of the attendant advantages thereof will be readily apparent as the same becomes better understood with reference to the following detailed description when considered in connection with the accompanying drawings wherein:

FIG. 1 is a part sectional, part schematic side view, (with parts omitted), of a pultrusion machine employing the novel mechanical and process features of the present invention;

FIG. 1a is a schematic illustration of a nip roller assembly employed as an alternate structure for one of the heated dies shown in the pultrusion machine of FIG. 1;

FIG. 2 is a front view of a guide fixture according to the present invention disposed between the multiple spool supply and the impregnating vessel shown in FIG. and serving to maintain the individual fiber tows separated;

FIG. 6 is a sectional view of one of the heating dies employed in the pultrusion machine shown in FIG. 1 and taken along line VI—VI of FIG. 7;

FIG. 6a is a view similar to FIG. 6 illustrating a sectional view of the heated nip roller assembly shown in FIG. 1a;

FIG. 7 is a schematic side view of one of the heating dies shown in FIG. 1 and illustrating the replaceable slip die cover employed on the heating dies; and FIG. 8 is a front view of the adjustable metering device shown in the pultrusion machine of FIG. 1.

DETAILED DESCRIPTION

Figure 3:
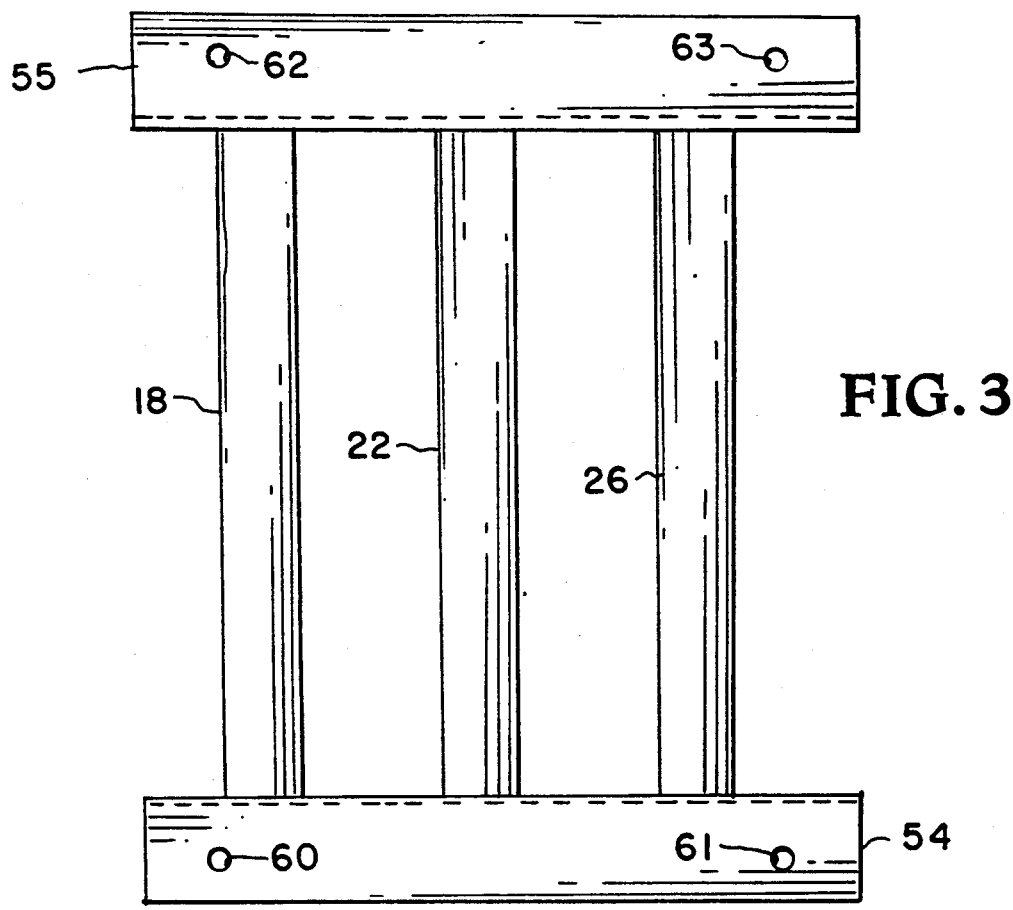
FIG. 3 is a top view of the corrugated insert and cylindrical bars employed in the impregnator vessel shown in the pultrusion machine of FIG. 1.

Referring now to the drawings and more particularly to FIG. 1, the improved pultrusion machine of the present invention is shown and designated generally by reference numeral 10. Pultrusion machine 10 is employed to make continuous lengths of prepreg from suitable high moduli fiber tows and high performance, high-temperature, thermoplastic, heat processable polymers, such as polyetherimide (PEI), polyarylsulfone (PAS), polyamide-imide (PAI), polyetheretherketone (PEEK) and Langley Research Center Thermoplastic Polyimide (LARC-TPI). Multiple spools 12 of suitable fiber, such as graphite, 12,000 filament count polyacrylonitrile (PAN)-base tow, was employed in the specific example described herein. Other filament counts and fibers such for example, fiberglass, aramid, boron, other materials and/or combination mixtures thereof, are also equally applicable in practice of the present invention.

The ends of the individual fiber tows 13 leading from spools 12 are threaded through, and maintained separated by, a tow guide fixture 14 (FIG. 2) leading to an impregnator tank or vessel 16, as will be further explained hereinafter. Impregnator vessel 16 contains a quantity of impregnating material 17 and is provided with a corrugated bottom surface having alternate raised portions (designated by reference numerals 28, 29, 30 and 31) and depressed areas (designated by reference numerals 19, 23, and 27), extending transversely thereacross. An insert 15 is disposed within impregnator vessel 16. Insert 15 fixedly supports three transverse cylinderical rods, designated by reference numerals 18, 22, and 26. Rods 18, 22, and 26 are disposed, respectively, in depressed areas 19, 23, and 27 of impregnator vessel 16, as will be further explained hereinafter.

An adjustable metering device 33 is attached to impregnator vessel 16 at the exit port 34 thereof. As shown, exit port 34 is disposed in the side wall of impregnator vessel 16 and metering device 33 serves as a closure therefor. Metering device 33 also serves to control the amount of impregnating material 17 contained in fiber tows 13, and consequently the fiber/impregnating material ratio in the prepreg. Fiber tows 13, upon exiting from impregnator vessel 16, are impregnated with the impregnating material 17 and stuck together to form prepreg tape 35, as will be further explained hereinafter.

A drying area 38 for prepreg tape 35 is disposed in spaced adjacency to impregnator vessel 16 and includes a pair of thin, spaced, perforated stainless steel plates 40,41. Forced hot air is directed onto both of perforated plates 40,41, as prepreg tape 35 is pulled therethrough, from a plurality of air nozzles 43. Nozzles 43 are in fluid communication with a conventional adjustable temperature and pressure hot air source, not illustrated.

Upon exiting drying chamber 38, prepreg 35 is drawn over and through a heated die system as designated generally by reference numeral 45. In the preferred embodiment heated die system 45 includes six, substantially identical, die elements as designated by reference numerals D1, D2, D3, D4, D5, and D6, and supported on a planar die support surface 46.

Each of dies D1-D6 is provided with a flat base and a flat heated prepreg contact surface having radiused edges, as will be further explained hereinafter. Heated die system 45 is designed to eliminate any residual solvent or liquid remaining in prepreg 35 by passing over dies D1 and D2 while a downward force is exerted by inverted die D3. Thus, the bottom surface of prepreg 35 is held against the heated surface of dies D1 and D2 with the top surface being held against the heated surface of die D3. Both top and bottom surfaces of prepreg 35 are sandwiched between dies D4 and D5. Heated die D5 is disposed within an adjustable retention fixture (not shown) and serves as a pressurized impregnating material spreading and compaction mechanism to fine tune the thickness of prepreg 35, as will be further explained hereinafter. Heated die D6, in conjunction with a cylinderical transverse tension bar 47, serves to maintain a pulling force on the reciprocating pullers 48.

Reciprocating pullers 48 are conventionally designed to exert a pulling force of 150-1400 pounds of prepreg 35 and at an adjustable constant rate of speed of 6-12 inches per minute. At a speed of 6 to 7.2 inches per minute, the moving prepreg 35 is in contact with dies D1-D6 for approximately 24-28 seconds. This allows sufficient residence or dwell time for the thermoplastic polymers to melt and flow at elevated temperatures with the temperatures selected being dependent upon the thermoplastic polymer selection. Prepreg 35 exits reciprocating pullers 48 to pass beneath an idler roll bar 49 and is coiled on a take-up spool 50 for stowage or subsequent use. Tension in the system is adjusted by changing the distance between the individual dies D2, D3, D4, D6 and between the dies and tension bar 47. Die D5 is disposed in a fixture (not shown) that permits up and down adjustment relative to die D4 to also permit increasing or decreasing of the tension on prepreg 35.

Impregnator vessel 16, insert 15, metering device 33, perforated plates 40,41, tension bar 47 and idler roll 49 are all fabricated from type 347 stainless steel stock and polished to a surface finish of four microinches RMS.

Referring now to FIG. 1a, a slight modification of the die assembly shown in FIG. 1 is illustrated. In this embodiment, elongated heated die D5 is replaced by a heated nip roller assembly, designated generally by reference numeral R5. Roller assembly R5 includes a cylinderical bar 51 rotatably disposed within, and having an arcurate portion extending along the length from a stainless steel heating block 52, as will be further explained hereinafter.

Referring now to FIG. 2, tow guide fixture 14 is more clearly illustrated and, as shown, is provided with a plurality of separated tow passageways or openings 21 therethrough for feeding separate tows of fiber from spools 12 to impregnator vessel 16. In a preferred embodiment of the present invention, tow guide fixture 14 was machined from a solid block of polytetrafluoroethylene (Teflon) stock and provided with twenty-two openings 21 therethrough. Obviously, a larger or smaller number of openings 21 may be employed and when less than twenty-two tows of fiber are employed, the fiber tows are positioned in the center of fixture 14 utilizing the number of openings required. Polytetrafluoroethylene was chosen as the material for tow guide fixture due to its natural lubricating properties. Other materials having these desired properties, or other materials such as ceramic or porcelain thread guides or inserts for the openings, would be equally applicable in fabricating tow guide fixture 14 for practice of the present invention. Openings 21 maintain fiber tows 13 separated, with the individual tows being flattened and made ribbon-like as they pass over the entrance of impregnator vessel 16.

Figure 4:
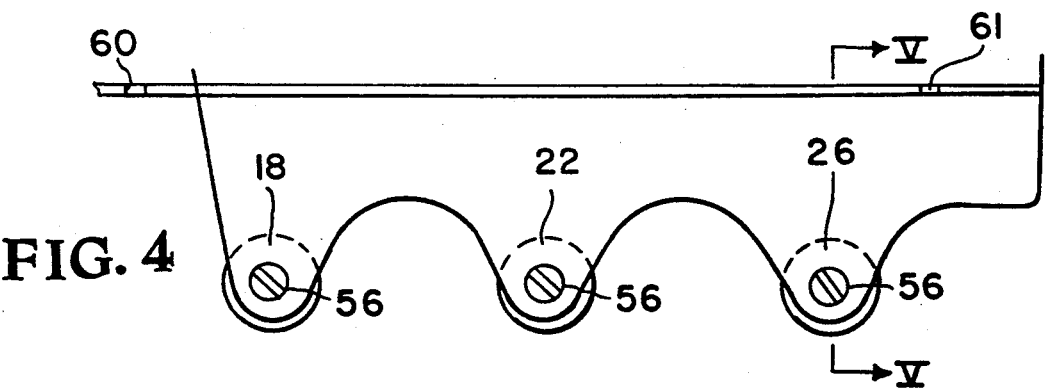
FIG. 4 is a side view of the insert shown in FIG. 3.
Figure 5:
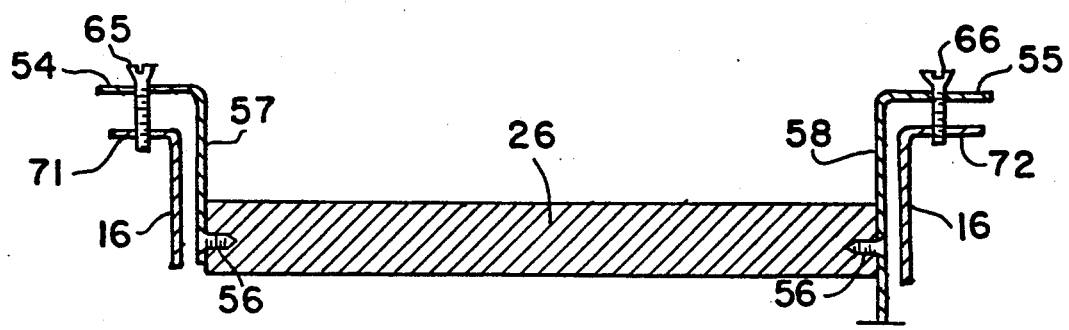
FIG. 5 is a sectional view of the vessel insert shown in FIGS. 2 and 3 and taken along line V—V of FIG. 4.

Referring now more particularly to FIGS. 3-5 the details of insert 15 disposed within impregnator vessel 16 will now be described. As shown therein insert 15 includes a pair of spaced top flanges 54,55 having a pair of integral side flanges 57,58 disposed in perpendicular relationship thereto. Side flanges 57,58 are provided with undulating bottom surfaces essentially mating with and received by the corrugated bottom surface of impregnator vessel 16. The three cylindrical rods 18, 22, and 26 are secured at each end, via bolts 56, to side flanges 57,58. As discussed hereinbefore, cylindrical rods 18, 22, and 26 are disposed, respectively, within depressed areas 19, 23 and 27 of impregnator vessel 16. Threaded adjustment screws are disposed within openings 60,61 and 62,63 provided, respectively, through top flanges 54,55 of insert 15. Two of these adjustment screws are illustrated in FIG. 5 and designated by reference numerals 65,66. Adjustment screws 65,66 (and the other two adjustment screws not visible in the drawing) engage tapped openings in flanges on vessel 16 and serve to control the relative spaced position of cylindrical rods 18, 22 and 26 within depressed areas 19, 23 and 27 of vessel 16.

The spacing between rods 18, 22 and 26 and depressed areas 19, 13 and 17, in conjunction with raised areas 28, 29, 30 and 31 of impregnator vessel 16, spreads the individual fiber tows 13 and forces the spread fiber tows to follow the corrugated contour of the bottom of impregnator vessel 16 to force the impregnating material, whether in solution and/or in suspension, to infiltrate and to impregnate the fiber tows.

Referring now more particularly to FIGS. 6 and 7, the details of heating die D1 will now be described. In the interest of brevity, only heating die D1 is described in detail, it being understood that heating dies D2, D3, D4 and D6 are of essentially identical construction. Heating die D5 varies slightly in construction, as will be more clearly described hereinafter. In the preferred embodiment, elongated heating dies D1-D6 had a width of approximately 2.5 inches and a length of six inches and are disposed in spaced relationship on planar die mounting surface 46. Additional widths and lengths for the heating die elements are obviously adaptable for use with the present invention. As illustrated in the cross sectional view shown in FIG. 6, heated die D1 includes a rectangular heating block 74 machined from suitable heat resistant and heat conductive metal, such as 17-4 PH stainless steel. A pair of bores 76,77 are drilled through the entire length of heating block 74 and serve to receive conventional high density, cartridge type, heating elements having a heating capability of 50-1000 degrees F and one of which is schematically shown and designated by reference numeral 75. A smaller bore 78 is also drilled through one end of heating block 74 to approximately the center thereof and serves to receive a conventional thermocouple (not illustrated).

A pair of side shims 80,81 are positioned along the entire length, and a top shim 82 is disposed along the top length, of heating block 74. Top shim 82 is provided with a flat surface and radiused edges to accommodate a replaceable slip die cover 84. Replaceable slip die cover 84 is also provided with a flat top surface and radiused edges conforming in size and shape to the top surface of top shim 82. In addition, replaceable slip die cover 84 is provided with an integral vertical end flange extending essentially perpendicular from each end thereof, as designated by reference numerals 83,85. Vertical end flanges 83,85 ensure that prepreg 35 is maintained in alignment while passing over heated dies D1-D4 and D6. The side and top shims 80, 81, 82 in the illustrated embodiment are formed of aluminum alloy 6061. Other suitable heat conducting metals, such as copper alloy and steel alloy, may be used to construct the shims. Replaceable slip die cover 84 in the preferred embodiment is formed of stainless steel type 347. Each of the stainless steel components are polished to four microinches RMS. If desired, shims 80, 81, and 82, and replaceable slip die cover 84, could be omitted as separate elements and included as part of an entire structure fabricated from stainless steel stock.

Heating die D5 employed in the illustrated embodiment differs slightly from the remaining dies specifically described hereinbefore in that the side and top shims and the replaceable slip die cover described for heating dies D1-D4 and D6 are omitted. Heating die D5 is formed of the same stainless steel heating block construction and provided with a radiused edge machined directly onto and along the length of this heating block. A suitable and adjustable support structure maintains heating die D5 inverted and in the angular position shown in FIG. 1 relative to heating die D4. The spacing between the radiused edge on heating die D5 and the flat heated surface of heating die D4 is adjusted to control the final thickness of prepreg 35. The pressure exerted by heating die D5 onto prepreg 35 determines, or fine tunes, the final thickness of prepreg 35 to that desired. In a specific example the radiused edge of heating die D5 contacting prepreg 35 is 0.015 inch, polished to a surface finish of four microinches RMS, and the contact force exerted by die D5 onto prepreg 35 is approximately 25 inch-pounds. This allows for final thickness control, and improved fiber wetting and densification.

Referring now to FIG. 6a, nip roller assembly R5 includes an elongated heating block 52 similar to that described in reference to heating die D1 shown in FIG. 6. Heating block 52 is provided with an arcurate groove 86 along substantially the center of the bottom surface and extending the length thereof. Arcurate groove 86 supports rotatable bar or nip roller 51 therein such that a radius of nip roller 51 extends from heating block 52 along the entire length thereof. Three bores, designated by reference numerals 87,88, and 89 extend through the length of heating block 52 and are disposed in a triangular pattern about arcurate groove 86. Bores 87,88 and 89 serve to receive conventional high density cartridge heating elements each having a heating capability of 50–1000 degrees F., as described hereinbefore in reference to FIG. 6. A smaller diameter bore 90 is drilled through one end of heating block 52 to the approximate center thereof to receive a conventional thermocouple. In operation, nip roller assembly R5 is used in lieu of heating die D5, as illustrated in FIG. 1a, and is retained by a suitable fixture (not shown), in a conventional manner, to permit adjustment of the relative distance between nip roller 51 and heating die D4 and control the thickness of prepreg 35 to that desired. The diameter of nip roller 51 is 1.0 to 2.0 inches and the required downward force is a function of prepreg thickness and fiber areal weight requirements. This is achieved by downward adjustment to approximately 25 inch-pounds for most prepregs.

Referring now to FIG. 8, the details of adjustable metering device 33 will now be described. Metering device 33, as described hereinbefore is disposed adjacent, and completely covers, opening 34 in impregnator vessel 16. The opening in metering device 33 permits the passage of prepreg 35 exiting vessel 16 while limiting the quantity of impregnating material retained on the fiber tows. Metering device 33 includes a bottom plate 91 and a top plate 92 bolted thereto by a pair of bolts 93,94. An elongated opening or passageway 95 of controlled size is formed between the planar faces of bottom plate 91 and top plate 92 by positioning a pair of spaced shims therebetween. In the preferred embodiment shown, these shims are designated by reference numerals 96,97 and spaced apart to determine and limit the width of prepreg 35 exiting impregnator vessel 16. Shims 96,97 may be constructed of strips of suitable tape wrapped around, either top plate 92 or, bottom plate 91 at the spacing desired or predetermined. Suitable shim tape formed of a polylimide material is commercially available in thicknesses of 0.002–0.0035 inches. Shims made of a metal alloy or a suitable polymeric material could also be used, the important criteria being that any shim material employed must be insoluble to the solvent employed in the impregnating material. When desired, multiple layers of the shim tape may be employed for tailoring the height or cross sectional dimensions of opening 95 to that desired.

A formula for calculating the dimensions of the cross-section of opening 95 was derived from the basic formula:

$$Mv,1 = Rv,1 + Fv,1 \tag{1}$$

where
- $Mv,1$ = metered volume of length 1
- $Rv,1$ = resin solution volume of length 1
- $Fv,1$ = fiber volume of length 1 and $$M \text{ cm}^3, 1 = R \text{ cm}^3, 1 + F \text{ cm}^3, 1 \tag{2}$$

where $l = 30.48 \text{ cm}$ then $$M \text{ cm}^2 = \frac{R \text{ cm}^3, 1 + F \text{ cm}^3, 1}{30.48} \tag{3}$$

and $$M = \left\{ \frac{\frac{Rd2 \times Rv}{Rd1 \times Rwf} + Fv}{30.48 \text{ cm}} \right. \tag{4}$$

where
- M = cross section area of metering die, cm$^2$
- Rd1 = density of the mixed resin solution, g/cm$^3$
- Rd2 = density of the resin solids in the mixed resin solution, g/cm$^3$
- Rv = volume of resin in the pultrusion, 30.48 cm in length, cm$^3$
- Rwf = resin solids weight fraction in the resin solution
- Fv = fiber volume in the pultrusion, 30.48 cm in length, cm$^3$.

In the derivation, it is assumed that the resins and solvents are mixed by weight percent and that published densities of each constituent are used in the calculation. The derivation is also based on impregnation and consolidation of a section of the prepreg 30.48 centimeters (12.0 inches) in length. The derivation also assumes that the operator pre-selects the fiber volume percent that is required in the final consolidated composite in which the prepreg is to be used. If more than one resin is mixed, for example, a polymer blend, then a further extension of the derivation is required. Thus, where the mixed resin solution contains resin #1 (r1) + resin #2 (r1) + resin #n (rn) . . .

then $$Rd1 = [(wf\,r1)(d\,r1)] + [(wf\,r2)(d\,r2) + \tag{5}$$

$$[(wf\,rn)(d\,rn) \ldots ] + [(wf\,\text{solvent})(d\,\text{solvent})]$$

and $$Rd2 = \left\{ \frac{(r1 \text{ w/o} + r2 \text{ w/o} + rn \text{ w/o} \ldots)}{\frac{(r1 \text{ w/o}}{dr1} + \frac{r2 \text{ w/o}}{dr2} + \frac{rn \text{ w/o}}{drn} \ldots} \right. \tag{6}$$

where
- d = density, g/cm$^3$
- wf = weight fraction, expressed in decimals
- r w/o = resin weight percent, expressed in grams.

The operation of the invention is believed apparent from the above description. Initially, pultrusion machine 10 is set up as shown in FIG. 1. The desired and pre-calculated cross sectional area opening in metering device 33 is set to achieve the desired fiber/resin ratio for the impregnated fibers. The ends of the tows 13 are aligned parallel, approximately 0.25 inch between centers and threaded through tow guide fixture 14, pulled through the empty impregnator vessel 16 and metering device 33, pulled through the drying or solvent removal area 38, and threaded through the heated die system 45. The ends of the thus assembled fiber tows are then taped to a suitable metal plate and potted firmly in position over a length of approximately six inches by a solvent type thermoplastic and dried at room temperature. Any conventional thermoplastic material may be employed for the potting procedure and usually, the thermoplastic to be placed into impregnator vessel 16 is used for this procedure. The potted end is then removed from the metal plate and attached to the pultrusion pulling mechanism 48. The heated die system is brought to operating temperature, the forced hot air is turned on, impregnating solution 17 added to resin impregnator vessel 16, and pulling mechanism 48 actuated.

The temperature of the forced hot air and the heated dies is maintained below the flash point or auto-ignition temperature of any inflammable solvent that may be employed in the impregnating solution. The corrugated or undulating structure of the stainless steel impregnator vessel 16 and the round bars 18, 22 and 26 of insert 15 spread and maintain the graphite fiber tows 13 to a width of approximately 0.375 inch while passing through the impregnating material. This action causes the resin in solution and/or suspension to infiltrate and to impregnate the fiber tows. Metering device 33 allows only a predetermined amount of the impregnating material to exit from the impregnator vessel with the fiber tows. The final ratio of resin solids to fiber reinforcement in the consolidated prepreg is controlled by metering device 33. As discussed hereinbefore, all fiber contact surfaces in the impregnator vessel and insert are polished to a four microinch root mean square (RMS) surface finish. When the impregnated fiber tows exit metering device 33 they are disposed in side-by-side relationship and stuck together in sheet or ribbon form by the impregnating material.

The impregnating material 17 employed in impregnator vessel 16 may be (1) one or several polymer solids (polymer blends) in powder form and suspended in water to form a slurry; (2) powdered polymer(s) suspended in a solvent or mixed solvents, having a balanced specific gravity equal to the specific gravity of the suspended polymer; (3) a combination of several polymers of which one or more are soluble in the solvent or solvents used while one or more are insoluble and held in suspension; or (4) powdered polymers in a solvent system wherein the polymer is soluble. In the latter, resin pellets may be used instead of powder to produce the resin solution. Examples of soluble polymers useful in practice of the present invention include polyetherimide (PEI) soluble in methylene chloride or chloroform, polycarbonate (PC) soluble in methylene chloride, polymethyl methacrylate soluble in methylene chloride, polyarylsulfone (PAS) soluble in methylene chloride, and polysulfone (PS) soluble in methylene chloride.

Insoluble polymers include polyetheretherketone (PEEK), polyamide-imide (PAI) and Langley Research Center Thermoplastic Polyimide (LARC-TPI), a BTDA-3,3'DABP composition manufactured by Mitsui-Toatsu Chemicals, Inc. Another insoluble polymer is polyethylene powder which may be included in some mixtures of impregnating materials due to its ability to lower the viscosity of the material and because it acts as an internal mold release agent in making final products from prepreg. When employing an insoluble polymer it is desirable to employ a balanced specific gravity of the liquids used to keep the insoluble polymer powders in suspension. This is readily accomplished by mixing the polymer powder in a liquid or mixture of liquids having a specific gravity equal to the specific gravity of the polymer. For example, the specific gravity of methylene chloride is 1.33 and the specific gravity of chloroform is 1.49. These two solvents may be mixed in a ratio to bring the specific gravity of the mixture to 1.43, the specific gravity of LARC-TPI. Thus, when stirring LARC-TPI powder into a liquid having a specific gravity of 1.43, it will remain in suspension indefinitely thereby forming a perfect slurry. By using the same concept, any thermoplastic powder can potentially be rendered into a perfect slurry. Solvents employed in the present invention include water, methylene chloride, chloroform, and mixtures thereof.

Although the invention has been described relative to specific embodiments thereof, it is not so limited and there are numerous modifications and variations thereof that will be readily apparent to those skilled in the art in the light of the above teachings.

The specific embodiments described have been directed to specific thermoplastic prepreg but it is to be understood that the impregnating material 17 may also be a selected thermosetting polymer or resin if so desired. Also, in the description herein, the terms "resin" and "polymer" are to be considered as generic and synonymous and include any thermoplastic or thermosetting impregnating material. It is therefore to understood that the invention may be practiced other than as specifically described herein.

What is claimed as new and desired to be secured by Letters Patent of the United States is:

1. In a pultrusion machine for making continuous length prepreg tape wherein a plurality of fiber tows are pulled through a resin impregnation bath into a drying area and through a heated, shaping die system before being wound onto a take-up spool, the improvement therein comprising:

an impregnator vessel having an entrance and an exit side permitting pulling of multiple fiber tows therethrough, the impregnator vessel including an exiting orifice and an adjustable metering device disposed adjacent and completely covering said exiting orifice of said impregnator vessel to control the quantity of impregnating material contained within said fiber tows exiting said impregnator vessel, the metering device comprising a first elongated plate member and a second elongated plate member disposed in adjacent relationship thereto, a pair of spaced shims disposed between and in contact with both said first and said second elongated plate members, said shims and surfaces of said first and said second elongated plate members defining a thin rectangular opening between said first and said second elongated plates, bolt means securing said first and said second elongated plate members in fixed relationship, whereby said thin rectangular opening serves as a metering orifice to control the quantity of impregnating material permitted to exit said impregnator vessel with said fiber tows;

said impregnator vessel containing a quantity of fiber impregnating material and having a corrugated interior bottom surface therein;

said corrugated interior bottom surface including alternate raised and depressed areas disposed transverse to said entrance and said exit sides of said vessel;

an insert for said impregnator vessel including a pair of support walls and a cylindrical rod extending the length of and disposed partially within each of said depressed areas of said corrugated interior bottom surface of said impregnator vessel;

multiple spools of fiber tow disposed adjacent said impregnator vessel;

a guide fixture disposed adjacent one side of said impregnator vessel and between said vessel and said multiple spools of fiber tow and serving to maintain individual fiber tows from said multiple spools of fiber tow separated when entering said impregnator vessel;

a drying area for the impregnated fiber tows disposed adjacent said exit side of said impregnator vessel;

said drying area including a pair of spaced perforated sheets receiving the impregnated fiber tows therebetween and a source of hot air directed toward said perforated sheets to facilitate drying of the impregnated fiber tows;

a series of heated dies receiving the impregnated fiber tows from said drying area, wherein said heated dies comprise a plurality of elongated dies positioned in spaced relationship on a planar die mounting plate surface and transversely disposed relative to the impregnated fiber tows, the plurality of elongated dies comprising six elongated heated dies, and wherein a first, second, third, fourth and sixth member thereof are provided with a flat heated surface having radiused edges, said radiused edges of said first, second and fourth members of said six elongated heated dies being spaced from said die mounting plate surface, and said flat heated surface having radiused edges of said third and said sixth heated dies being disposed adjacent said die mounting plate surface; and wherein a fifth die including an elongated heated nip roll is disposed adjacent the flat heated surface having radiused edges of said fourth die; and wherein the impregnated tow fibers pass over and contact the flat heated surface of said first and said second members of said six elongated heated dies, pass beneath while maintaining contact with the flat heated surface of said third die, pass between and maintain contact with the flat heated surface of said fourth die and said heated nip roll of said fifth die, and then pass beneath and maintain contact with the flat heated surface of said sixth die; and at least some members of said series of heated dies being provided with flat heated surfaces having radiused edges for contacting the impregnated fiber tows;

a pulling mechanism receiving the prepreg tape; and a take-up spool disposed adjacent said pulling mechanism receiving the prepreg tape.

2. In a pultrusion machine for making continuous length prepreg tape wherein a plurality of fiber tows are pulled through a resin impregnation bath into a drying area and through a heated, shaping die system before being wound onto a take-up spool, the improvement therein comprising:

an impregnator vessel having an entrance and an exit side permitting pulling of multiple fiber tows therethrough, the impregnator vessel including an exiting orifice and an adjustable metering device disposed adjacent and completely covering said exiting orifice of said impregnator vessel to control the quantity of impregnating material contained within said fiber tows exiting said impregnator vessel, the metering device comprising a first elongated plate member and a second elongated plate member disposed in adjacent relationship thereto, a pair of spaced shims disposed between and in contact with both said first and said second elongated plate members, said shims and surfaces of said first and said second elongated plate members defining a thin rectangular opening between said first and said second elongated plates, bolt means securing said first and said second elongated plate members in fixed relationship, whereby said thin rectangular opening serves as a metering orifice to control the quantity of impregnating material permitted to exit said impregnator vessel with said fiber tows;

said impregnator vessel containing a quantity of fiber impregnating material and having a corrugated interior bottom surface therein;

said corrugated interior bottom surface including alternate raised and depressed areas disposed transverse to said entrance and said exit sides of said vessel;

an insert for said impregnator vessel including a pair of support walls and a cylindrical rod extending the length of and disposed partially within each of said depressed areas of said corrugated interior bottom surface of said impregnator vessel;

multiple spools of fiber tow disposed adjacent said impregnator vessel;

a guide fixture disposed adjacent one side of said impregnator vessel and between said vessel and said multiple spools of fiber tow and serving to maintain individual fiber tows from said multiple spools of fiber tow separated when entering said impregnator vessel;

a drying area for the impregnated fiber tows disposed adjacent said exit side of said impregnator vessel;

said drying area including a pair of spaced perforated sheets receiving the impregnated fiber tows therebetween and a source of hot air directed toward said perforated sheets to facilitate drying of the impregnated fiber tows;

a series of heated dies receiving the impregnated fiber tows from said drying area, wherein said heated dies comprise six elongated heated dies and wherein a first, second, third, fourth and sixth member thereof are provided with a flat heated surface having radiused edges, said radiused edges of said first, second and fourth members of said six elongated heated dies being spaced from said die mounting plate surface, said respective flat heated surface having radiused edges of said third and sixth heated dies being disposed adjacent said die mounting plate surface; and wherein a fifth die comprises an elongated heating die having a flat heating surface and a radiused edge, said fifth die being angularly disposed adjacent the flat heated surface having radiused edges of said fourth die; and wherein the impregnated tow fibers pass over and contact the flat heated surface of said first and said second members of said six elongated heated dies, pass beneath while maintaining contact with the flat heated surface of said third die, pass between and maintain contact with the flat heated surface of said fourth die and said radiused edge of said fifth die and pass beneath and maintain contact with the flat heated surface of said sixth die;

a pulling mechanism receiving the prepreg tape; and a take-up spool disposed adjacent said pulling mechanism receiving the prepreg tape.

* * * * *